US009143015B2

(12) United States Patent
Nace et al.

(10) Patent No.: US 9,143,015 B2
(45) Date of Patent: Sep. 22, 2015

(54) BRUSH HOLDER FOR A BRUSH ASSEMBLY FOR A POWER TOOL MOTOR

(71) Applicant: Black & Decker Inc., Newark, DE (US)

(72) Inventors: Daniel F. Nace, Towson, MD (US); Marco A. Mattucci, Fallston, MD (US); Michael R. Marjomaa, Mount Wolf, PA (US); Craig A. Oktavec, Forest Hill, MD (US)

(73) Assignee: Black & Decker Inc., Newark, DE (US)

( * ) Notice: Subject to any disclaimer, the term of this patent is extended or adjusted under 35 U.S.C. 154(b) by 120 days.

(21) Appl. No.: 13/835,614

(22) Filed: Mar. 15, 2013

(65) Prior Publication Data

US 2013/0313924 A1 Nov. 28, 2013

Related U.S. Application Data

(60) Provisional application No. 61/650,622, filed on May 23, 2012.

(51) Int. Cl.
*H02K 7/14* (2006.01)
*H01R 39/00* (2006.01)
*H01R 39/42* (2006.01)
*H01R 39/38* (2006.01)
*H02K 3/34* (2006.01)
*H02K 5/14* (2006.01)

(52) U.S. Cl.
CPC ............... *H02K 3/345* (2013.01); *H02K 5/148* (2013.01)

(58) Field of Classification Search
CPC .............................. H02K 13/00; H02K 39/40
USPC ........................... 310/50, 239–240, 242, 245
See application file for complete search history.

(56) References Cited

U.S. PATENT DOCUMENTS

| | | | |
|---|---|---|---|
| 2005/0191888 A1* | 9/2005 | Ortt et al. ................... | 439/189 |
| 2008/0090504 A1* | 4/2008 | Trautner et al. ............. | 451/359 |
| 2009/0115266 A1* | 5/2009 | Hatfield et al. .............. | 310/50 |
| 2011/0175466 A1* | 7/2011 | Esenwein et al. ........... | 310/50 |

FOREIGN PATENT DOCUMENTS

GB 2302999 A * 2/1997

* cited by examiner

*Primary Examiner* — Jose Gonzalez Quinone
(74) *Attorney, Agent, or Firm* — Amir R. Rohani; Scott Markow

(57) ABSTRACT

A power tool is provided including a tool housing in which an electric motor is disposed. The electric motor includes a stator and an armature rotatably received within the stator. The armature has an armature shaft on which a commutator is mounted. The power tool further includes at least one brush assembly disposed around the commutator, the brush assembly including: a brush having two grooves on opposites surfaces therein; a brush holder comprising two support plates arranged defining guiderails that extend into the grooves of the brush to facilitate movement of the brush along a single axis; and a spring contacting the brush that urges the brush radially inwardly along the axis.

13 Claims, 7 Drawing Sheets

BRUSH HOLDER FOR A BRUSH ASSEMBLY FOR A POWER TOOL MOTOR

FIELD OF THE INVENTION

The present invention relates to power tools, and more particularly to a brush system for a power tool motor.

BACKGROUND

The statements in this section merely provide background information related to the present disclosure and may not constitute prior art.

Known portable power tools typically have an electric motor received within a housing. One common type of electric motor used in power tools has a rotor, a stator, and brushes. The rotor includes a rotor shaft, laminations mounted on the rotor shaft, armature windings wound in slots in the lamination stack, and a commutator mounted on the rotor shaft and electrically connected to the armature windings. The stator may have field windings wound in laminations, or may have permanent magnets. The brushes are mounted in brush housings, often known as brush boxes, surrounding the commutator. Electric current is supplied from a power source through the brushes to the commutator and then to the armature windings.

The brushes and brush boxes are typically part of a brush assembly(ies). The brush boxes and brushes are disposed diametrically opposite to each other with the commutator disposed therebetween. The brush assembly(ies) includes springs that urge the brushes against the commutator.

FIG. 1 illustrates a half piece 102 of a conventional brush assembly 100. Each piece 102 in this design includes a base member 103 on which a brush box 104 is mounted. The base member 103 has a semi-annular periphery 106. Brush box 104 includes a mounting portion 116, an arm 118 connected to the mounting portion 116 and extending perpendicularly from the base member 103, and a metallic brush box 120. Brush box 104 receives a brush therein. The mounting portion 116 includes a plurality of legs 122 for crimping to corresponding cutout portions 124 in the base member 103 to secure the mounting portion 116 to the base member 103. The spring 101 includes one end connected to the arm 118 and the other end having a contact portion 132. The contact portion 132 is disposed adjacent to the second open end 128 of the brush box 120. When the brush is received in the brush box 120, the contact portion 132 of the spring 101 contacts the brush and urges the brush radially inwardly against the motor commutator.

FIG. 2 depicts the conventional brush assembly 100 including two half pieces 102 inside a power tool. As can be shown in this figure, the brush half pieces 102 are inserted inside a groove 103 of the tool housing. The brush box 120 are arranged around the commutator 34 of the motor 14. Bosses 134 are used to mate the two housing halves together after assembling the half pieces 102 is complete.

The brush assembly 100 depicted herein is for a direct current (DC) cordless power tools. However, similar brush assemblies may be used in alternating current (AC) corded power tools. Further, also the brush box 120 depicted in FIG. 1 mounted on a brush card 102, similar brush boxes are mounted directly into the tool housing around the commutator.

The conventional brush assembly described herein has several disadvantages. First, brush box 120 includes a large amount of metal, which is both expensive and requires a great degree of accuracy in performing procedures such as stamping, bending and crimping the metal components. In addition, the gap between the brush box 120 and the brush is prone to collecting dust and debris over time. This increases the wear on the brush over time and may even cause the brush to jam inside the brush box. A jammed or "hung" brush results in the tool failing during runtime and may even damage the motor commutator. Moreover, since the brush box 120 encloses all four sides of the brush, it limits direct brush exposure to airflow. This can raise the brush box 102 temperature to fairly high levels, particularly in high power applications such as power tools, which can potentially damage the tool housing.

Figure 1:
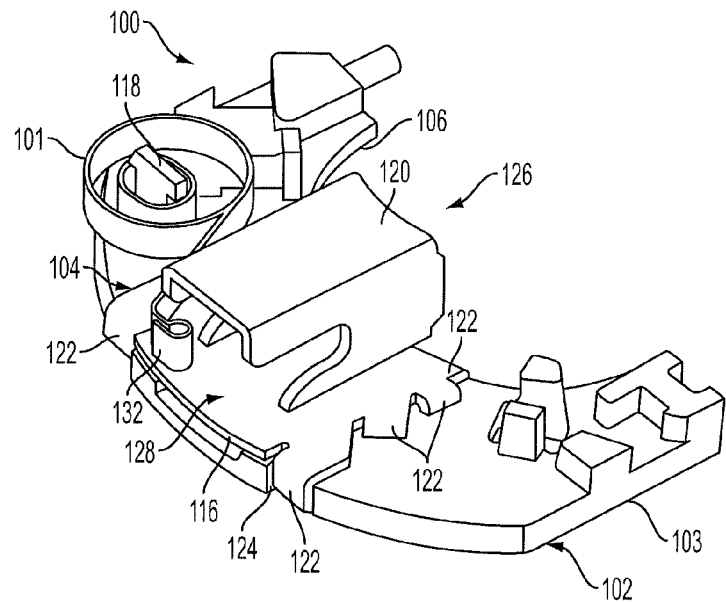
FIG. 1 illustrates a conventional brush assembly with a brush box.
Figure 2:
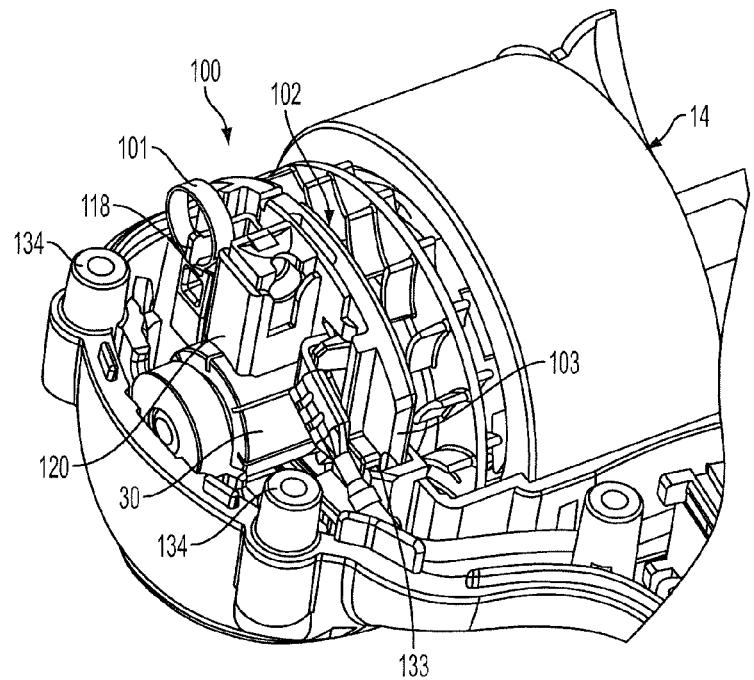
FIG. 2 illustrates the arrangement of the brush assembly of FIG. 1 inside a power tool.

The drawings described herein are for illustrative purposes only of selected embodiments and not all possible implementations, and are not intended to limit the scope of the present disclosure. Corresponding reference numerals indicate corresponding parts throughout the several views of the drawings.

SUMMARY

According to an embodiment of the invention, a power tool is provided. The power tool includes a tool housing in which an electric motor is disposed. The electric motor includes a stator and an armature rotatably received within the stator. The armature has an armature shaft on which a commutator is mounted. The power tool further includes at least one brush assembly disposed around the commutator, the brush assembly including: a brush having two grooves on opposites surfaces therein; a brush holder comprising two support plates arranged defining guiderails that extend into the grooves of the brush to facilitate movement of the brush along a single axis; and a spring contacting the brush that urges the brush radially inwardly along the axis.

According to an embodiment, the brush holder is supported by the tool housing. In an embodiment, the tool housing includes at least one openings around the commutator in which the brush assembly is arranged, the tool housing including retaining features for retaining the brush holder in the opening. In an embodiment, the brush holder comprises conductive material.

According to an embodiment, the two support plates are arranged along a single plane and the brush holder further comprises at least one side plate extending angularly from the two support plates to provide an opening for the axial movement of the brush. In an embodiment, the side plate includes a terminal pin extending therefrom adapted to couple to a motor terminal. In an embodiment, the side plate is supported by the tool housing.

According to an embodiment, the tool housing includes a spring post formed therein adjacent the brush assembly to support the spring in the proximity of the brush.

According to an embodiment, the brush holder includes a spring post extending therefrom to support the spring in the proximity of the brush. The brush holder may include at least one side plate extending angularly from the support plates to provide an opening for the axial movement of the brush, and the spring post extends from the side plate perpendicularly to the axis of the brush.

According to an embodiment, a shunt wire is provided attaching the brush to a motor terminal. In an embodiment, a brush card is provided on which the brush holder is mounted, the brush card being supported by the tool housing.

According to an embodiment, the grooves extend through the entire length of the brush. Alternatively, the grooves extend through only one end of the brush and close-ended at an opposite end.

DESCRIPTION

Figure 3A:
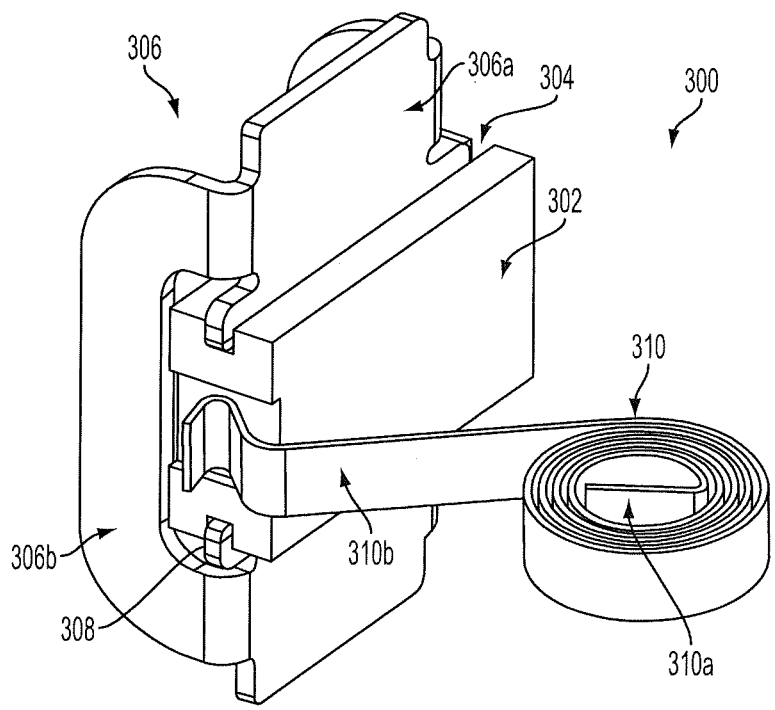
FIG. 3A illustrates a perspective view of a brush assembly according to an embodiment of the invention.
Figure 3B:
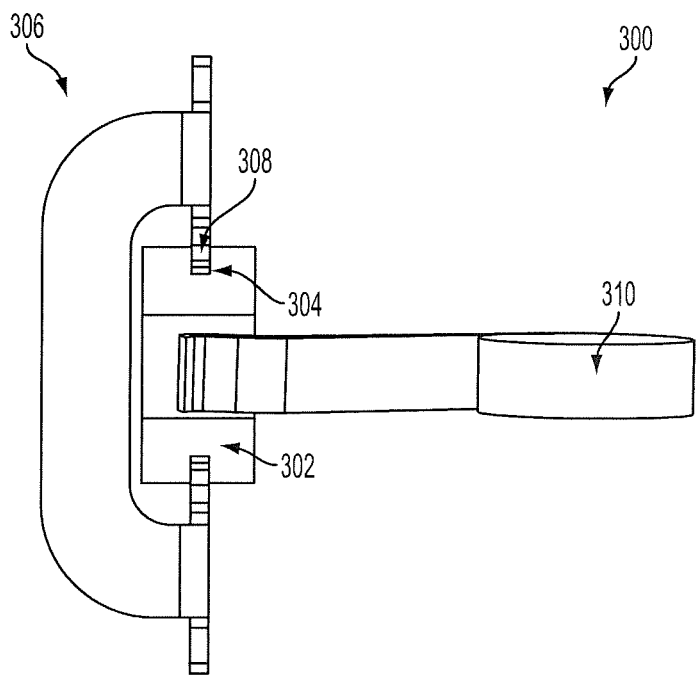
FIG. 3B illustrates a rear view of the brush assembly of FIG. 3A, according to an embodiment.

Referring to FIGS. 3A and 3B, a perspective view and a rear view of a brush assembly 300 is illustrated, according to an exemplary embodiment of the invention. In this embodiment, a brush 302 is illustratively shown with two grooves 304 on two opposing surfaces. The brush is supported by a brush holder 306 that includes two guide rails 308 engaging oppositely-arranged grooves 304 in the opposing surfaces the brush 302. In an embodiment, the guide rails 308 may be open-ended to allow for easy removal of the brush 302 (e.g., when the brush need be replaced during a routine power tool service). The grooves 304 on the brush 302 may be similarly be open-ended on one or both sides. Alternatively, the grooves 304 may extend only through a portion of the brush 302 and be close-ended on one or both sides.

The brush holder 306 may be formed in different shapes to accommodate the back and forth (axial) movement of the brush 302. For example, the brush holder 306 may include support plates 306a arranged on a first plane and extended on two sides of the brush 302 to form the guides 308, and one or more legs 306b (also referred to as side plates 306b) that support the support plates 306a and engage a portion of the tool housing. The legs 306b may protrude on one or more sides of the support plates 306a at an angle (typically 90 degrees). It is possible for one of the legs 306b to be on the same plane as the support plates 306a. Size and angular arrangement of the support plates 306a and legs 306b may vary from one tool to another depending on the tool housing and motor design requirements. The brush holder 306 may be mounted on a portion of the tool housing via the legs 306b, the support plates 306a, or a combination of the two. The brush holder 306 may alternatively be mounted on a brush card, which is in turn secured to the tool housing.

Figure 4:
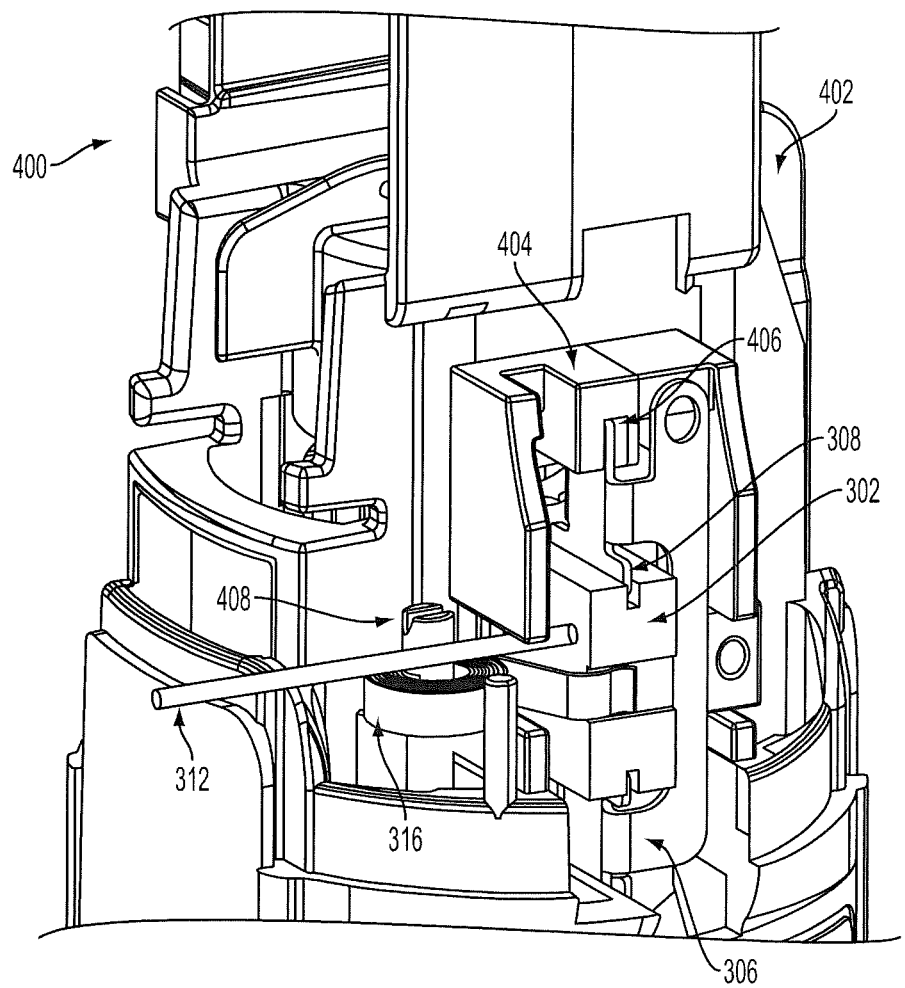
FIG. 4 illustrates a perspective view of a portion of an exemplary power tool, in this case a small angle grinder, incorporating the brush assembly of FIG. 3A, according to an embodiment.

A spring mechanism 310 is mounted adjacent the brush 302. A first leg 310a of the spring engages a post (described later) and a second leg 310b extends from the spring 310 to engage a back portion of the brush 302 and apply a biasing force to the brush towards the motor armature commutator. In one embodiment, the brush holder 306 includes no legs 306b and the plates 306a is provided as two separate parts embedded in the tool housing. In yet another embodiment, the support plates 306a (or lets 306b) may be embedded into additional components, which are them supported or embedded into the tool housing FIG. 4 illustrates a perspective view of a portion of a power tool 400, in this case a small angle grinder, incorporating the brush assembly 300 described above, according to an embodiment of the invention. The full operation of a grinder is beyond the scope of this disclosure. Reference is made to U.S. Pat. No. 8,087,977 assigned to Black & Decker Inc., which is incorporated herein in its entirety by reference, for an example of a grinder. An outer shell of the grinder 400 that houses the brush assembly 300 has been removed for illustration purposes, although the main housing 402 that houses the motor (not shown) and supports the brush assembly 300 has been depicted. The tool housing 402 includes two opening 404 on the two sides of the commutator for arranging the brush assembly 300. The openings 404 include retaining features 406, which may be ribs, slots, snapping features, etc., to securely maintain the brush holder 306 in the tool housing 402. The tool housing 402 further includes a post 408 arranged adjacent the opening 404 to accommodate the spring 310. The post 408 may be an integral part of the tool housing 402. The post 408 includes a slot that receives the first leg 310a of the spring 310. A flexible shunt wire 312, made of braided copper or similar material, is welded at one end to the brush 302. The other end of the shut wire 312 may be connected to a motor terminal, as disclosed in U.S. Pat. No. 7,059,038 assigned to Black & Decker Inc., which is incorporated herein by reference in its entirety.

During assembly, according to an exemplary embodiment, the brush 302 is inserted through the guide rails 308 of the brush holder 306 adjacent the motor commutator. The spring 310 is then inserted into the post 408 and the second leg 310b of the spring 310 is manually pulled to engage the back of the brush 302.

Figure 5A:
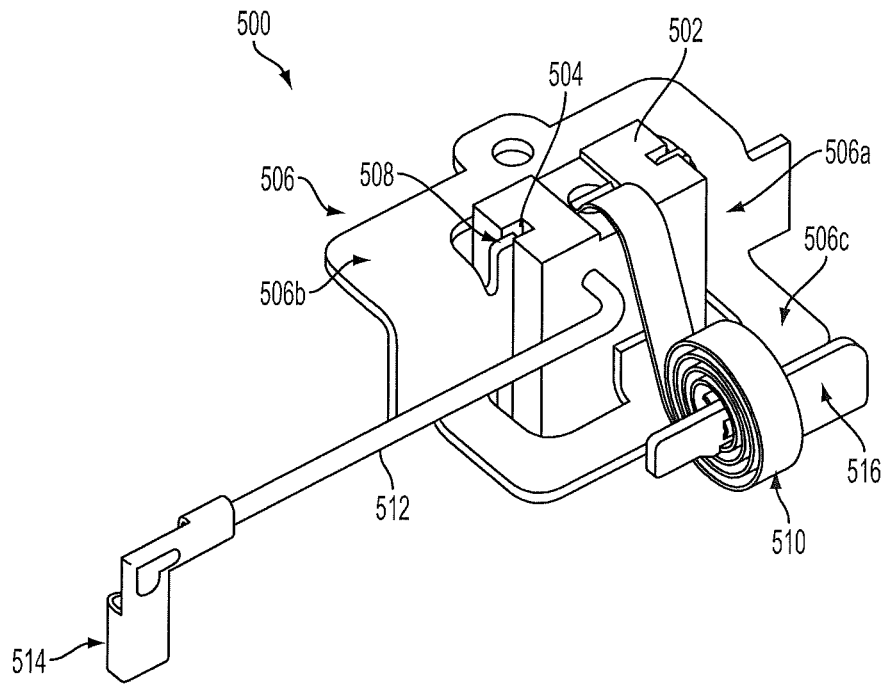
FIG. 5A illustrates a perspective view of a brush assembly according to an alternative embodiment of the invention.
Figure 5B:
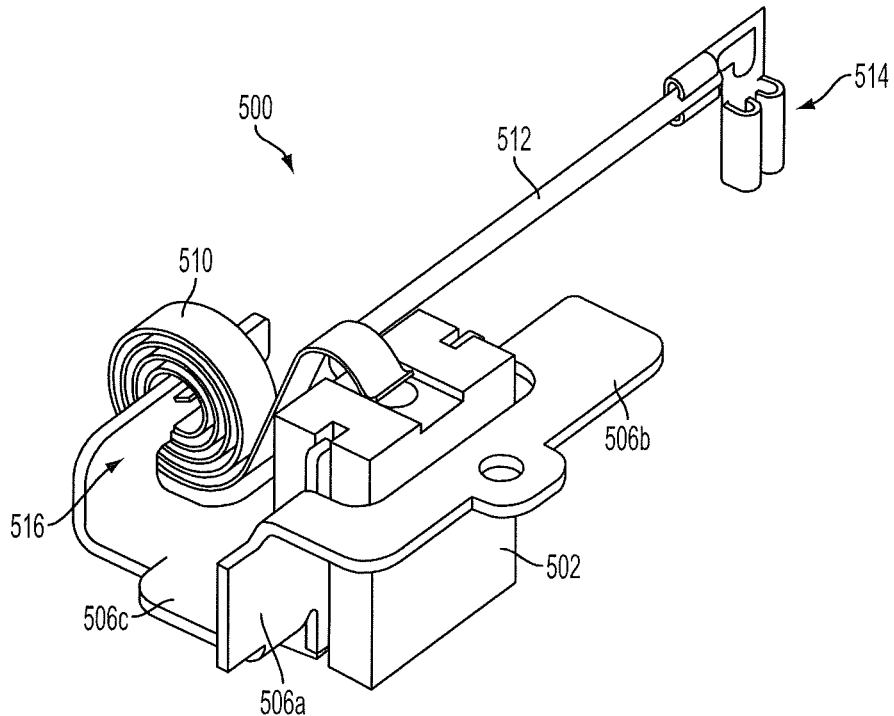
FIG. 5B illustrates a rear view of the brush assembly of FIG. 5A, according to an embodiment.

FIGS. 5A and 5B depict perspective front and rear views of a brush assembly 500, according to an alternative embodiment of the invention. In this embodiment, similarly to the fist embodiment, a brush 502 is illustratively shown with two grooves 504 on two opposite surfaces. The brush is supported by a brush holder 506 that includes two guide rails 508 engaging oppositely-arranged grooves 504 in the opposite surfaces the brush 502. As in the first embodiment, the guide rails 508 may be open-ended to allow for easy removal of the brush 502.

The brush holder 506 may be formed in different shapes to accommodate the back and forth (axial) movement of the brush 502. In the illustrated example, the brush holder 506 includes support plates 506a arranged on a first plane and extended on two sides of the brush 502 to form the guides 508, and one or more side plates 506b, 506c that support the support plates 506a and engage a portion of the tool housing. In this embodiment, side plates 506b and 506c protrude angularly (typically 90 degrees) from the support plates 506a in opposite directions, although it is envisioned that other arrangements of the side plates 506b, 506c are within the scope of this invention. It is possible for one of the side plates 506b, 506c to be on the same plane as the support plates 506a. The brush holder 506 may be mounted on a portion of the tool housing via the side plates 506b and/or 506c, the support plates 506a, or a combination of the two. Additionally, according to this embodiment, a spring post 516 extends from the side plate 506c to support a spring 510 of the brush assembly 500. Also depicted in these figures is shut wire 512 connected to a terminal 514.

Figure 6:
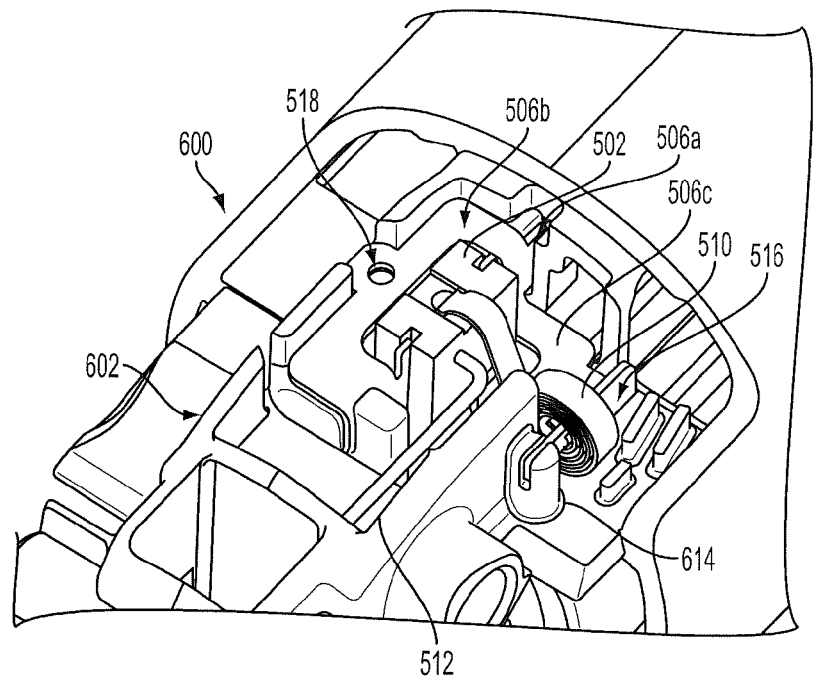
FIG. 6 illustrates a perspective view of a portion of an exemplary power tool, in this case a small angle grinder, incorporating the brush assembly of FIG. 5A, according to an embodiment.
Figure 7:
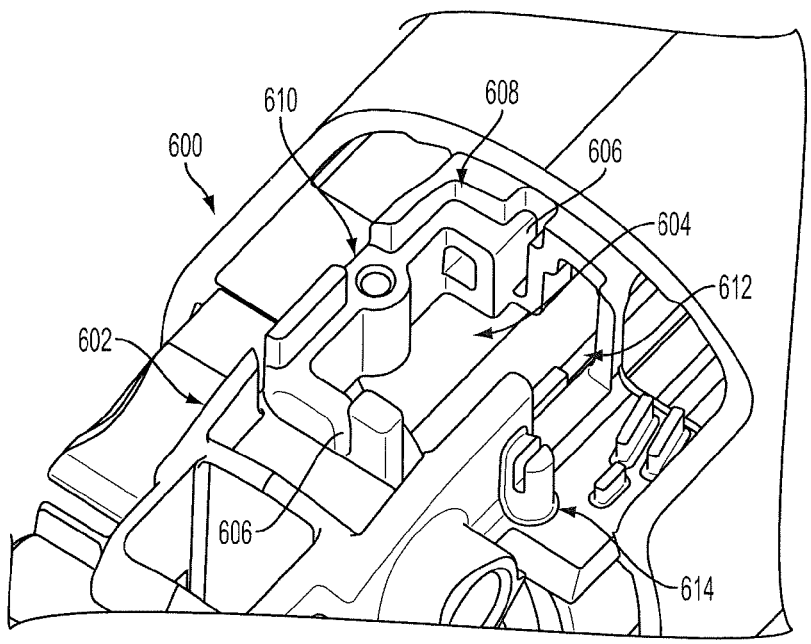
FIG. 7 illustrates the same perspective view of FIG. 6, without the brush assembly assembled into the housing, according to an embodiment.

FIG. 6 illustrates a perspective view of a portion of a power tool 600, in this case a small angle grinder, incorporating the brush assembly 500 described above, according to an embodiment of the invention. FIG. 7 depicts the same perspective view of the grinder 600 without components of the brush assembly 500. An outer shell of the grinder 600 tool housing that houses the brush assembly 500 has been removed for illustration purposes, although the main housing 602 that houses the motor (not shown) and supports the brush assembly 500 has been depicted. The tool housing 602 includes two opening 604 on the two sides of the commutator for arranging the brush assembly 500. Arranged in the periphery of the openings 604 are retaining features such as slots 606, arranged to receive end portions of the support plate 506a, and side portions 508 arranged to accommodate side plate 506b. In addition, a screw receptacle 610 may be arranged in alignment with a hole 518 in the side plate 506b to receive a screw in order to secure the brush holder 506 in the tool housing 602. In the periphery of the opening 604 may further be provided a gap 612 through which the spring 510 is supported by the spring post 516. Tool housing 602 further includes a support post 614 arranged adjacent the gap 612 to support an end of the spring post 516. A flexible shunt wire 512, made of braided copper or similar material, is welded at one end to the brush 502. The other end of the shut wire 512 may be connected to a motor terminal.

Figure 8:
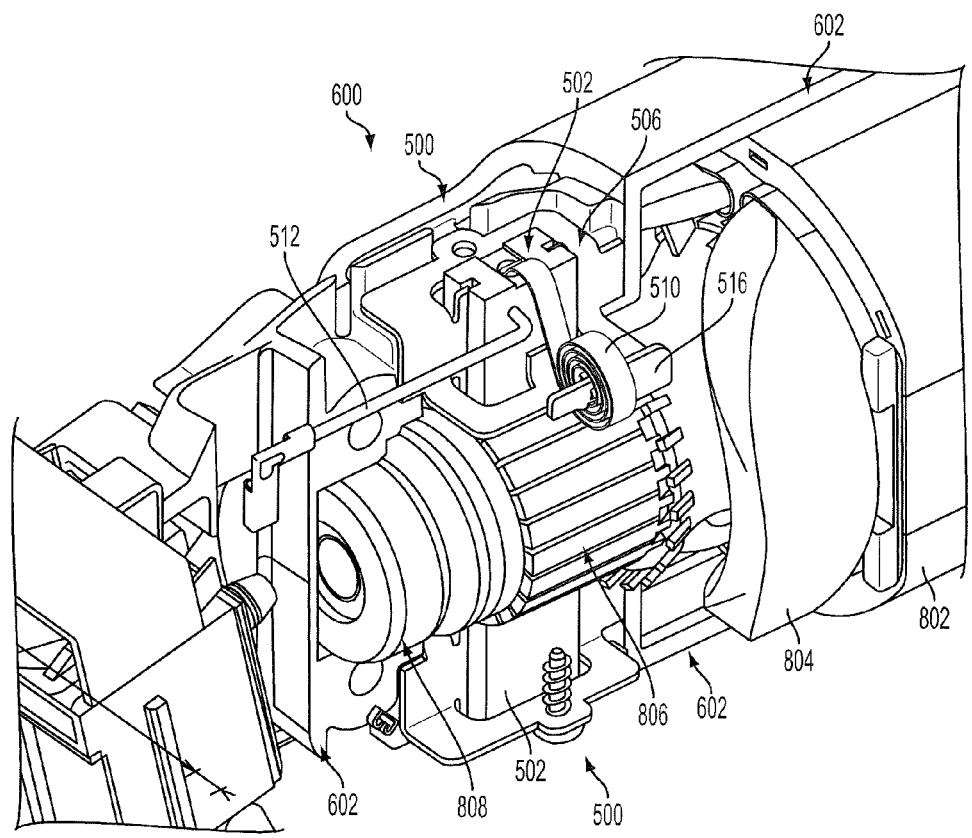
FIG. 8 illustrates a similar perspective view to FIG. 6, with half of the tool housing removed to show the motor components, according to an embodiment.

FIG. 8 illustrates a similar perspective view to FIG. 6, with half of the tool housing 602 removed to show the motor components, including a stator (i.e., field) lamination stack (or field can) 802, field windings 804, an armature (not shown) arranged within the stator, a commutator 806 attached to the armature, and an armature shaft end bearing 808. Details of the operation of the motor in a grinder are outside the scope of this disclosure, and can be found in U.S. Patent Publication No. 2012/0077424 filed by Black & Decker, Inc., which is incorporated herein by reference in its entirety. This figure is provided to illustrate the arrangement of the brush assembly 500 with respect to the armature commutator 806.

Figure 9:
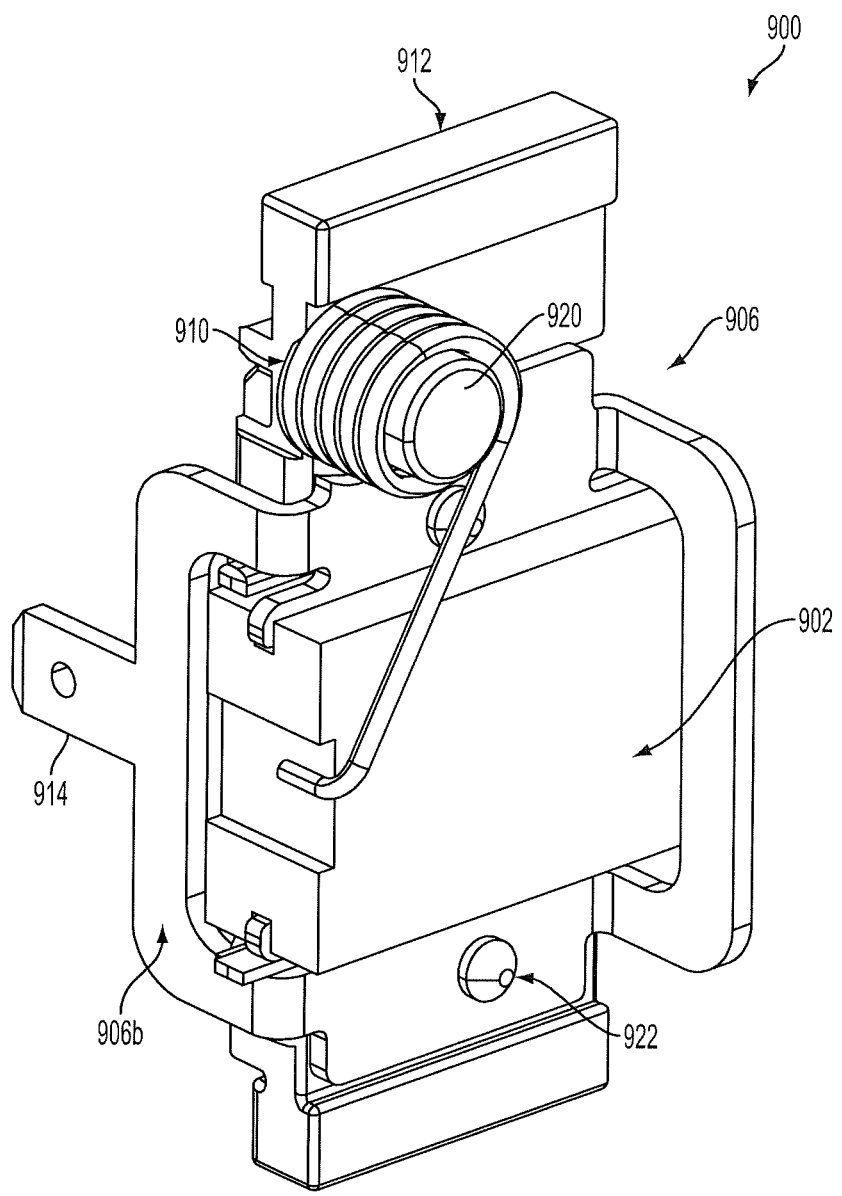
FIG. 9 illustrates a perspective view of a brush assembly according to yet another embodiment of the invention.

FIG. 9 illustrates a brush assembly 900 according to yet another exemplary embodiment of the invention. This embodiment is different from the previous two embodiments in two ways. First, the brush holder 906 is mounted on a brush card 912 rather than be the tool housing. The brush holder 906 is secured on the brush card 912 via two pins 922. The spring mechanism 910 is also mounted on a post 920 of the brush card 912. The brush card 912 may be attached to the tool housing using any known method. For example, the brush card 912, although shown as a rectangular piece herein, may be a one or two piece brush card with a circular inner aperture that can be received within the tool housing around the armature commutator. Second, in this embodiment, a side plate 906b of the brush holder 906 is provided with a pin terminal 914 provided to receive electric power for the brush 902. This arrangement therefore eliminates the need for a separate shunt wire connection to the brush 902. In an embodiment, a shunt wire (not shown) may be used to connect the brush 902 to the brush holder 906. It must be understood that these two features may be combined with any of the features and/or designed described in the previous embodiments.

It should be noted that although the illustrated power tool described above is a small angle grinder, the brush assemblies according to embodiments of the invention may be used in any other power tool, either corded or cordless, including, but not limited to, drills, impact drivers, circular saw, miter saw, chop saw, recip saw, router, power screw gun, sandom orbital sander, large angle grinders, impact wrench, etc. U.S. Pat. No. 7,893,583, assigned to Black & Decker Inc., which is incorporated herein by reference in its entirety, describes examples of different types of power tools that can incorporate the brush assemblies of this invention.

The term "tool housing" or "motor housing" in this disclosure has been used to refer to a single piece of insulating material housing the motor components including the stator, commutator, brushes, etc. It must be understood that the term "tool housing" or "motor housing" may include any type of housing, including, but not limited to, a motor frame (for framed motors), a multi-piece housing, a inner motor housing inside a separate outer housing, and outer housing containing a separate inner housing, etc.

The spring mechanisms depicted in the FIGS. 3A through 8 of this disclosure are commonly known as "clock springs." It must be understood that any type of spring may alternatively be used. For example, a conventional wound spring may be placed directly behind the brush. Also, instead of a spring post, it is envisioned that the spring may be supported by a hole in the housing.

The brush holders discussed in embodiments of this disclosure are made of conductive material. It is envisioned, however, that the brush holder may be made of either fully non-conductive material, or a combination of conductive and non-conductive material.

The description of the invention is merely exemplary in nature and, thus, variations that do not depart from the gist of the invention are intended to be within the scope of the invention. Such variations are not to be regarded as a departure from the scope of the invention.

The invention claimed is:

1. A power tool comprising:
a tool housing in which an electric motor is disposed, the electric motor including a stator and an armature rotatably received within the stator, the armature having an armature shaft on which a commutator is mounted; and
at least one brush assembly disposed around the commutator, the brush assembly including: a brush having two grooves on opposites surfaces therein; a brush holder comprising two support plates arranged defining guiderails that extend into the grooves of the brush to facilitate movement of the brush along a single axis; and a spring contacting the brush that urges the brush radially inwardly along the axis,
wherein the tool housing includes at least one opening adjacent the commutator through which the brush is disposed, and two oppositely-arranged slots formed around the periphery of the opening to receive two end portions of the support plates of the brush holder to securely maintain the brush holder in the tool housing.

2. The power tool of claim 1, wherein the brush holder is supported by the tool housing.

3. The power tool of claim 1, wherein the two support plates are arranged along a single plane and the brush holder further comprises at least one side plate extending angularly from the two support plates.

4. The power tool of claim 3, wherein the side plate includes a terminal pin extending therefrom adapted to couple to a motor terminal.

5. The power tool of claim 3, wherein the side plate is supported by the tool housing.

6. The power tool of claim 1, wherein the tool housing comprises a spring post formed therein adjacent the brush assembly to support the spring in the proximity of the brush.

7. The power tool of claim 1, wherein the brush holder includes a spring post extending therefrom to support the spring in the proximity of the brush.

8. The power tool of claim 7, wherein the brush holder comprises at least one side plate extending angularly from the support plates, and the spring post extends from the side plate perpendicularly to the axis of the brush.

9. The power tool of claim 1, further comprising a shunt wire attaching the brush to a motor terminal.

10. The power tool of claim 1, wherein the brush holder comprises conductive material.

11. The power tool of claim 1, wherein the power tool is a grinder powered by an AC power source.

12. The power tool of claim 1, wherein the grooves extend through the entire length of the brush.

13. The power tool of claim 1, wherein the grooves extend through only one end of the brush and close-ended at an opposite end.

* * * * *